United States Patent [19]

Arnold

[11] 4,305,025
[45] Dec. 8, 1981

[54] VELOCITY SERVO WITH ADAPTIVE TACHOMETER FEEDBACK

[75] Inventor: Bruce E. Arnold, Clinton, N.J.

[73] Assignee: The Singer Company, Stamford, Conn.

[21] Appl. No.: 148,864

[22] Filed: May 12, 1980

[51] Int. Cl.³ .............................................. H02P 5/16
[52] U.S. Cl. ..................................... 318/327; 318/331
[58] Field of Search ............... 318/326, 327, 328, 331; 324/164, 177

[56] References Cited

U.S. PATENT DOCUMENTS

| | | | |
|---|---|---|---|
| 3,475,672 | 10/1969 | Oltendorf | 318/331 |
| 3,560,828 | 2/1971 | Kobayashi et al. | 318/332 |
| 3,568,430 | 3/1971 | Walton | 318/314 |
| 3,875,485 | 4/1975 | Hornung | 318/331 |
| 4,227,129 | 10/1980 | Brooks | 318/331 |

OTHER PUBLICATIONS

Henry et al., "Motor Tachometer Circuit," IBM Technical Disclosure Bulletin, vol. 14, No. 7, Dec. 1971.

*Primary Examiner*—David Smith, Jr.
*Attorney, Agent, or Firm*—David L. Davis; Robert E. Smith; Edward L. Bell

[57] ABSTRACT

A velocity servo for a motor wherein a high speed tachometer is replaced by an arrangement which mathematically converts the input voltage and current to the motor into a speed signal, utilizing known formulas and constants. To maintain accuracy of the servo when the constants change value with the temperature, an inexpensive low speed tachometer is utilized to derive a signal indicative of the actual speed of the motor and this speed signal is compared with the mathematically computed speed signal. In the event that there is a difference, the constants are modified in accordance with such difference. This can be implemented either by electrically alterable circuit values or through computer or microprocessor techniques.

4 Claims, 8 Drawing Figures

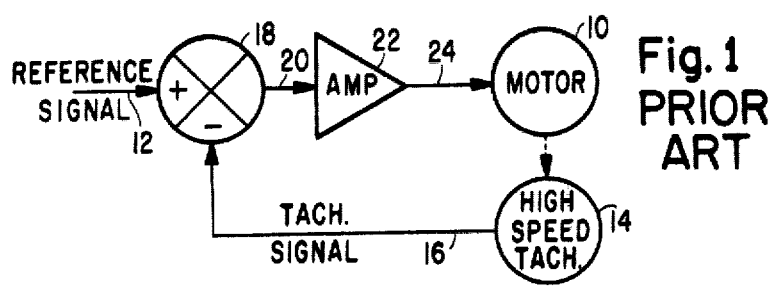
Fig. 1 PRIOR ART
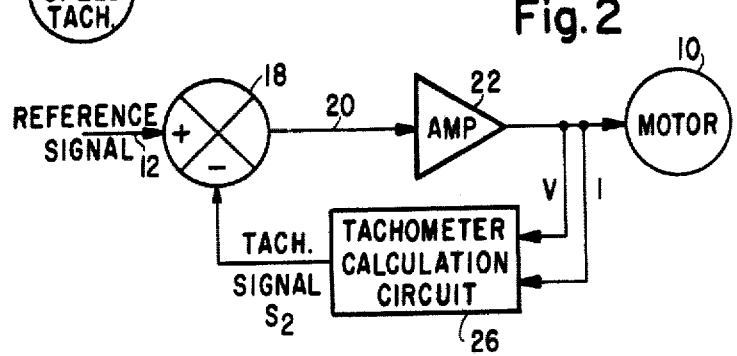
Fig. 2
Fig. 3A
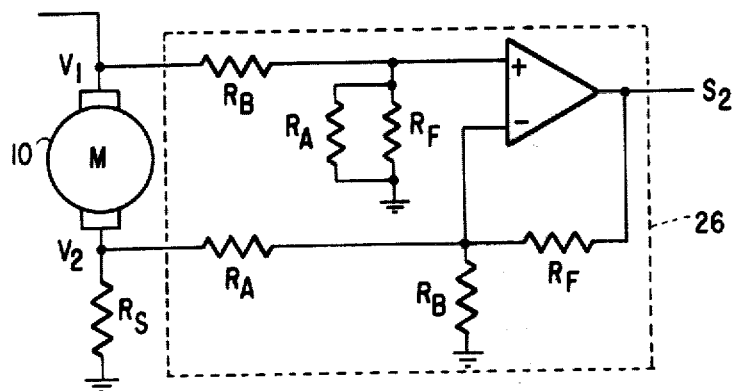
Fig. 3B
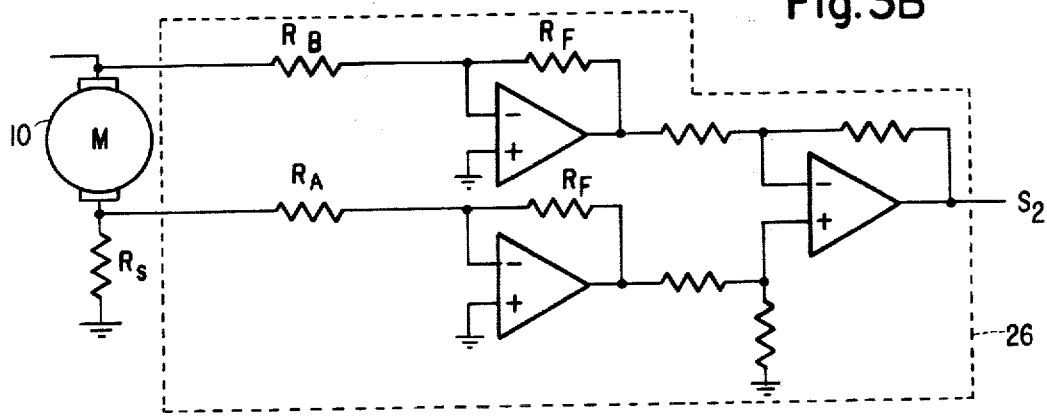
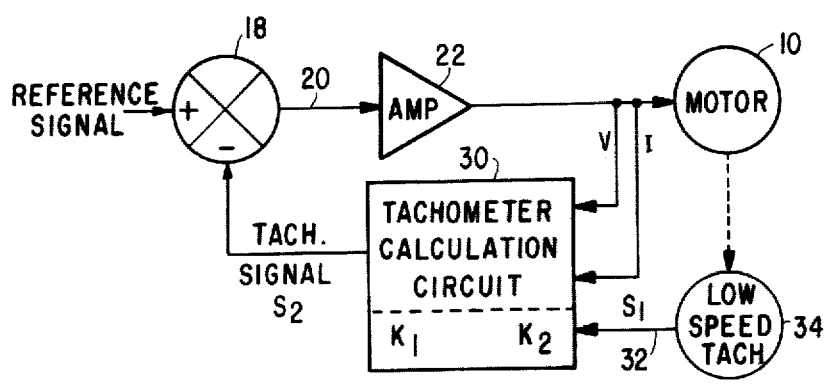
Fig. 4

VELOCITY SERVO WITH ADAPTIVE TACHOMETER FEEDBACK

DESCRIPTION

1. BACKGROUND OF THE INVENTION

This invention relates to motor speed control systems and, more particularly, to such a system utilizing tachometric feedback wherein an inexpensive speed sensor which is not required to have a high order speed and frequency response characteristic may be utilized.

A conventional prior art velocity servo system typically includes a tachometer coupled to the driven motor. This arrangement produces a tachometer signal indicative of the actual motor speed which is compared with a reference signal indicative of the desired motor speed of produce an error signal which is amplified to drive the motor. In order to obtain accurate velocity control, the tachometer must be sensitive to small and quick speed changes. In other words, the tachometer must exhibit high order speed and frequency response characteristics. The tachometer thus becomes both expensive and cumbersome and in some systems it may cost as much or more than the motor. For example, such a tachometer may include a large disc and hub connected to the motor shaft, the disc having a large number of slots on its periphery for interrupting the path of a light beam between a light source and a photodetector. The resulting "chopped" waveform from the photodetector is then "squared", amplified, filtered, processed and filtered again to produce the tachometer signal. Alternatively, a permanent magnet tachometer is conventionally utilized and the cost of such a tachometer can approach the cost of the motor.

It is therefore an object of this invention to provide a relatively inexpensive, but highly sensitive, replacement for a conventional velocity servo tachometer.

2. SUMMARY OF THE INVENTION

The foregoing and additional objects are attained in accordance with the principles of this invention by providing an arrangement which is responsive to the motor voltage and current for providing a "calculated" tachometer signal. In a hardware circuit implementation, the circuit values are chosen in accordance with known motor constants. Since these motor constants may vary with the temperature of the motor, the circuitry is adaptive in that the component values may be varied. An inexpensive low speed tachometer is provided to generate a signal corresponding to the actual motor speed. This signal is compared with the calculated tachometer signal and any difference between the two is utilized to vary the circuit component values to account for changes in the motor constants. Alternatively, the arrangement may be implemented utilizing an appropriately programmed computer or microprocessor.

BRIEF DESCRIPTION OF THE DRAWINGS

The foregoing will be more readily apparent upon reading the following description in conjunction with the drawings wherein:

FIG. 1 is a block diagram of a conventional prior art velocity servo system;

FIG. 2 is a block diagram of a velocity servo system utilizing a tachometer calculation circuit in place of a tachometer;

FIGS. 3A and 3B are schematic circuit diagrams of illustrative tachometer calculation circuits which may be utilized in the system of FIG. 2;

FIG. 4 is a block diagram of a velocity servo system utilizing an adaptive tachometer calculation circuit and a low speed tachometer, wherein the motor constants incorporated in the tachometer calculation circuit may be changed;

DETAILED DESCRIPTION

Figure 5:
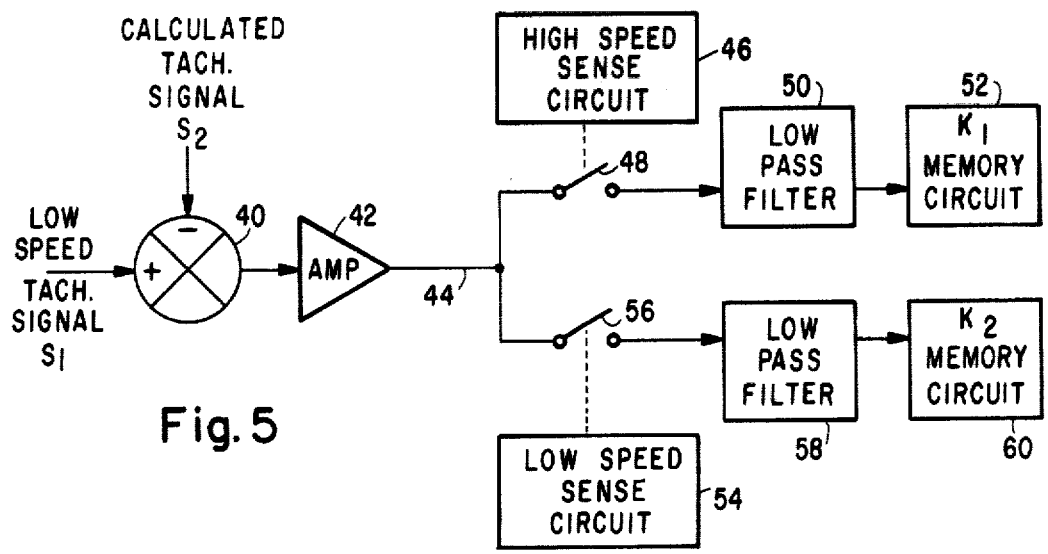
FIG. 5 is a block diagram of the adaptive portion of the tachometer calculation circuit for changing the motor constants in the system of FIG. 4.

Referring to the drawings, wherein like elements in different figures thereof have the same reference character applied thereto, FIG. 1 depicts a block diagram of a conventional prior art velocity servo system for controlling the speed of a motor 10 in response to a reference signal applied to the line 12 indicative of a desired motor speed. A tachometer 14 is mechanically coupled to the motor 10 and provides a tachometer signal on the lead 16 which is a function of the speed of the motor 10. An error detector 18 compares the desired speed reference signal on the lead 12 with the actual speed signal on the lead 16 to provide an error signal on the lead 20 which is amplified by the amplifier 22 and provided as a control signal on the lead 24 to control the speed of the motor 10. As previously discussed, it is desirable to be able to replace the tachometer 14, which is probably the most expensive component in the system of FIG. 1, with a less expensive but still highly accurate substitute.

FIG. 2 depicts a block diagram of a velocity servo system of the type shown in FIG. 1 wherein the tachometer 14 is replaced by a tachometer calculation circuit 26. The tachometer calculation circuit 26 makes use of the fundamental properties of the motor 10 in order to compute a value for the speed based on the voltage and current going to the motor 10. In the case where the motor 10 is of the permanent magnet type, this calculation is as follows:

$$V = K_e S + RI \tag{1}$$

or $$S = K_1 V + K_2 I \tag{2}$$

Thus, $$S_2 = K_t S \tag{3}$$

Where

| | |
|---|---|
| $K_1 = 1/K_e$ | (krpm/volt) |
| $K_2 = -R/K_e$ | (krpm/amp) |
| R = motor resistance | (ohms) |
| $K_e$ = motor back EMF constant | (volts/krpm) |
| V = motor terminal voltage | (volts) |
| I = motor current | (amps) |
| S = motor speed | (krpm) |
| $S_2$ = calculated tachometer signal | (volts) |

| | |
|---|---|
| $K_t$ = arbitrary circuit constant | (volts/krpm) |

FIG. 3 depicts a first illustrative implementation for the tachometer calculation circuit 26 of FIG. 2. From this circuit, the following relationship may be derived:

$$S_2 = \frac{R_F}{R_B} V_1 - \frac{R_F}{R_A} V_2 \tag{4}$$

Combining equation 2 and 3, $$S_2 = K_t K_1 V + K_t K_2 I \tag{5}$$

However, $V = V_1 - V_2$ and $V_2 = R_s I$. Therefore, equation (5) may be written as $$S_2 = \frac{K_t}{K_e} V_1 - \frac{K_t}{K_e} \left(1 + \frac{R}{R_s}\right) V_2 \tag{6}$$

By comparing equations (4) and (6), it can be seen that $$\frac{R_F}{R_B} = \frac{K_t}{K_e} \tag{7}$$

and $$\frac{R_F}{R_A} = \frac{K_t}{K_e} \left(1 + \frac{R}{R_s}\right) \tag{8}$$

Thus, knowing the values of $K_e$ and R from the motor specification, and choosing arbitrary values for $R_s$, $K_t$ and $R_F$, from equations (7) and (8), the values of $R_A$ and $R_B$ may be readily calculated. For example, if $K_e = 12$ v/krpm and $R = 1$ ohm, and selecting $R_s = 0.01$ ohm, $K_t = 1$ v/krpm and setting $R_F = 100,000$ ohms, then $R_A = 12,000$ ohms and $R_B = 1.21$ megohm, FIG. 3B depicts a second illustrative implementation for the tachometer calculation circuit 26 wherein the component values may likewise be readily calculated.

This calculated tachometer functions well so long as the two scaling factors $K_1$ and $K_2$ remain constant. In fact, the mathematical approach is often faster in response than a conventional tachometer which often requires noise filtering. This increased speed of response results in a greater potential servo bandwidth and/or better stability. However, this approach has a major flaw. Since the resistance of the motor is a function of temperature of the windings, $K_2$ becomes a function of the temperature. Typically, $K_2$ has a temperature coefficient of +0.4% per degree centigrade. Also, with some types of motors (such as those with ceramic magnets) $K_e$ is also a function of temperature and $K_1$ shows a typical temperature coefficient of +0.2% per degree centigrade. In motors with Alnico magnets, $K_1$ becomes constant and $K_2$ variations can also be neglected, making this calculated tachometer an extremely attractive design approach. In other motors, this approach is quite limited and can only be applied when the motor temperature remains constant.

The block diagram depicted in FIG. 4 illustrates a solution to the above problem by providing an improved tachometer calculation circuit 30. The tachometer calculation circuit 30 has an additional input signal over those provided to the tachometer calculation circuit 26. This signal is over the lead 32 and may be referred to as a speed calibration reference signal $S_1$, being taken from a tachometer 34 coupled to the motor 10. At first this appears to be similar to the hardware of the conventional prior art servo system (FIG. 1), but this is not the case. The tachometer 34 could be any available speed reference whose only attribute is accuracy. The speed and frequency response characteristics of the tachometer 34 are unimportant. For example, in a sewing machine, the low speed tachometer 34 may be implemented by utilizing a signal generated from the needle position sensor, which generates a signal once during each cycle of the sewing machine. The tachometer calculation circuit 30 utilizes the low speed tachometer signal $S_1$ to adaptively vary the constants $K_1$ and $K_2$ in the tachometer calculation circuit 30 as these constants vary with time and temperature, as will be described hereinafter.

FIG. 5 depicts a block diagram of the adaptive portion of a hardware implementation of the tachometer calculation circuit 30. The calculated tachometer signal, $S_2$, is compared to the low speed tachometer signal, $S_1$, in the error detector 40. The resultant error signal is amplified by the amplifier 42 to produce an amplified error signal on the lead 44. This amplified error signal on the lead 44 is then processed to determine the values of the two circuit constants $K_1$ and $K_2$. The value of $K_1$ is altered only while the motor is running at a high speed (illustratively at a speed greater than 50% of the top speed of the motor) since the back EMF constant has a dominant effect on the system equations at this time. Similarly, the value of $K_2$ is altered only while the motor is running at a low speed (illustratively between 2% and 25% of the top motor speed) since the effect of the motor resistance has a dominant effect on the system equations at this time. Thus, when the motor is running at greater than 50% of its top speed, the high speed sense circuit 46 closes the switch 48 to allow the amplified error signal on the lead 44 to pass through the low pass filter 50 to set a value for the constant $K_1$ in the memory circuit 52. Similarly, when the motor is running within a low speed range from about 2% to about 25% of its top speed, the low speed sense circuit 54 closes the switch 56 to pass the amplified error signal on the lead 44 through the low pass filter 58 to set the value of the constant $K_2$ in the memory circuit 60. The changes in the values of the constants $K_1$ and $K_2$ take place very slowly over the course of the day. All high speed feedback information for the main servo is taken from the calculated output of the tachometer calculation circuit 30. Thus, the response of the low speed tachometer 34 and of the adaptive circuitry only has to be fast enough to keep ahead of the temperature changes in the motor. Since the motor thermal time constant is on the order of 30 minutes, it is seen that the response time of the low speed tachometer need not be very fast.

Figure 6:
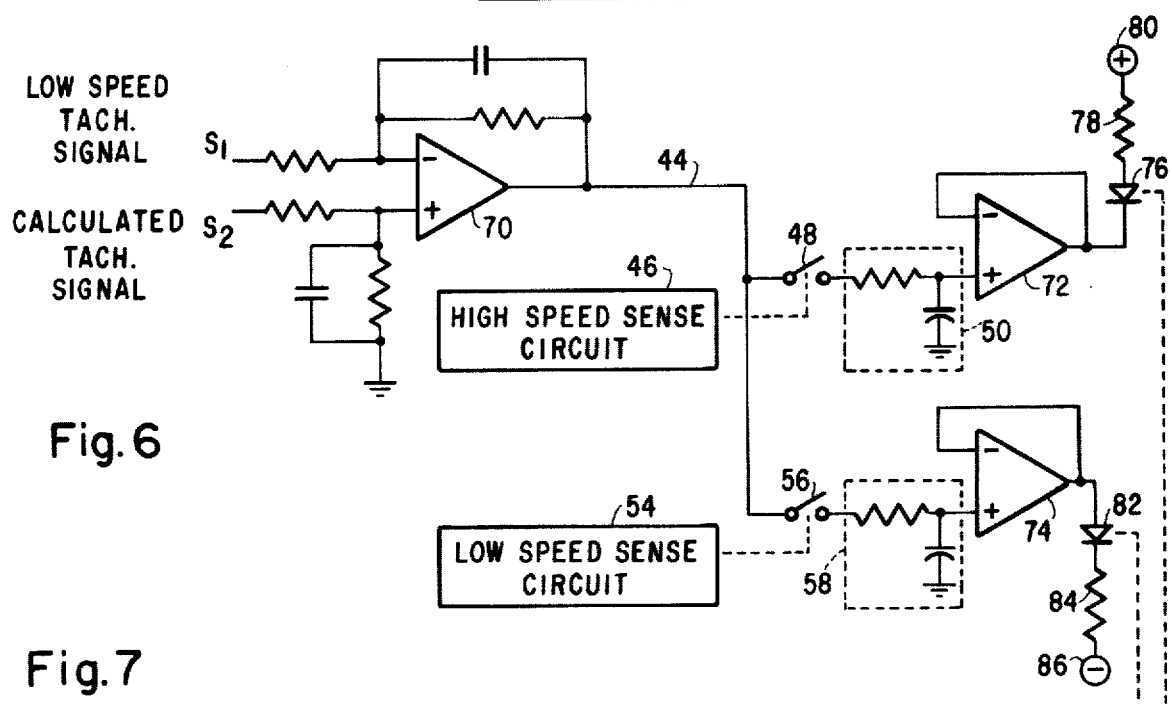
FIG. 6 is a schematic circuit diagram of illustrative circuitry for implementing the system depicted in block diagram form in FIG. 5.
Figure 7:
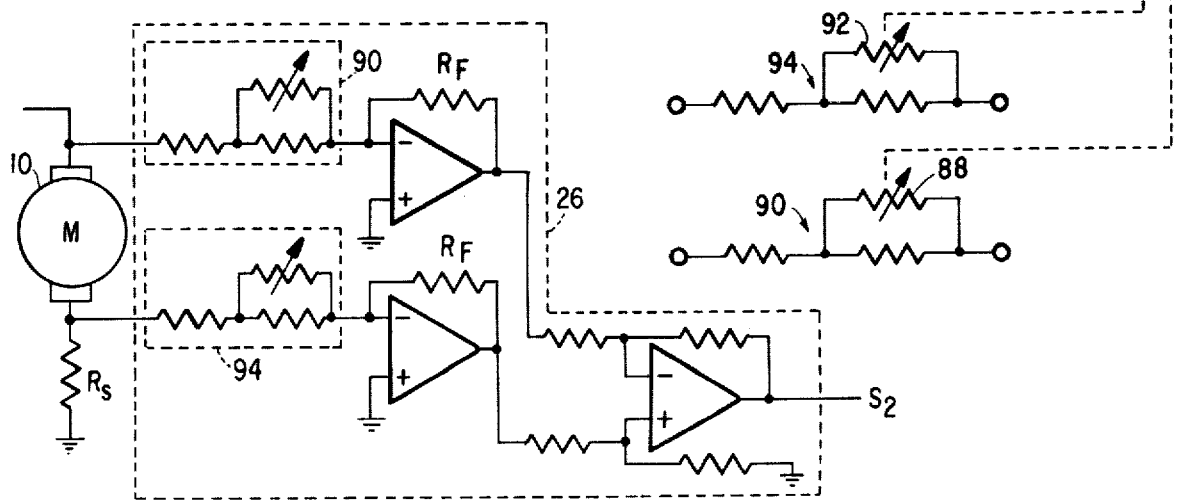
FIG. 7 is a schematic circuit diagram combining part of FIG. 6 in FIG. 3B.

FIG. 6 shows illustrative circuitry for implementing the block diagram of FIG. 2 where the memory circuits 52, 60, for changing the values of the constants $K_1$ and $K_2$ are implemented by means of light emitting diodes and photoresistive elements. As shown in FIG. 6, the low speed tachometer signal $S_1$ and the calculated tachometer signal $S_2$ are applied as inputs to a differential amplifier 70 whose output is the amplified error signal on the lead 44. At high speed operation of the motor, the amplified error signal is applied to the non-inverting input of the operational amplifier 72 and at low speed operation of the motor, the amplified error signal is applied to the non-inverting input of the operational amplifier 74. The output of the operational amplifier 72 is connected to the cathode of a light emitting diode 76 whose anode is connected through a resistor 78 to a source of positive voltage 80. Similarly, the output of the operational amplifier 74 is connected to the anode of a light emitting diode 82 whose cathode is connected through the resistor 84 to a negative voltage source 86. The light emitting diode 76 is optically coupled to a photoresistive element 88 connected in a series-parallel resistor network 90. The light emitting diode 82 is optically coupled to a photoresistive element 92 connected in a series-parallel resistor network 94. The resistor network 90 replaces resistor $R_B$ (FIGS. 3A and 3B) and the resistor network 94 replaces resistor $R_A$ (FIGS. 3A and 3B). With this arrangement, and with the photoresistors 88 and 92 having negative resistance coefficients, a positive error signal ($S_2$ greater than $S_1$) will result in an increasing value of $R_B$ and a decreasing value of $R_A$. Conversely, a negative error signal will result in a decreasing value of $R_B$ and an increasing value of $R_A$. FIG. 7 illustrates the resultant combination with respect to the circuit of FIG. 3B.

Figure 8:
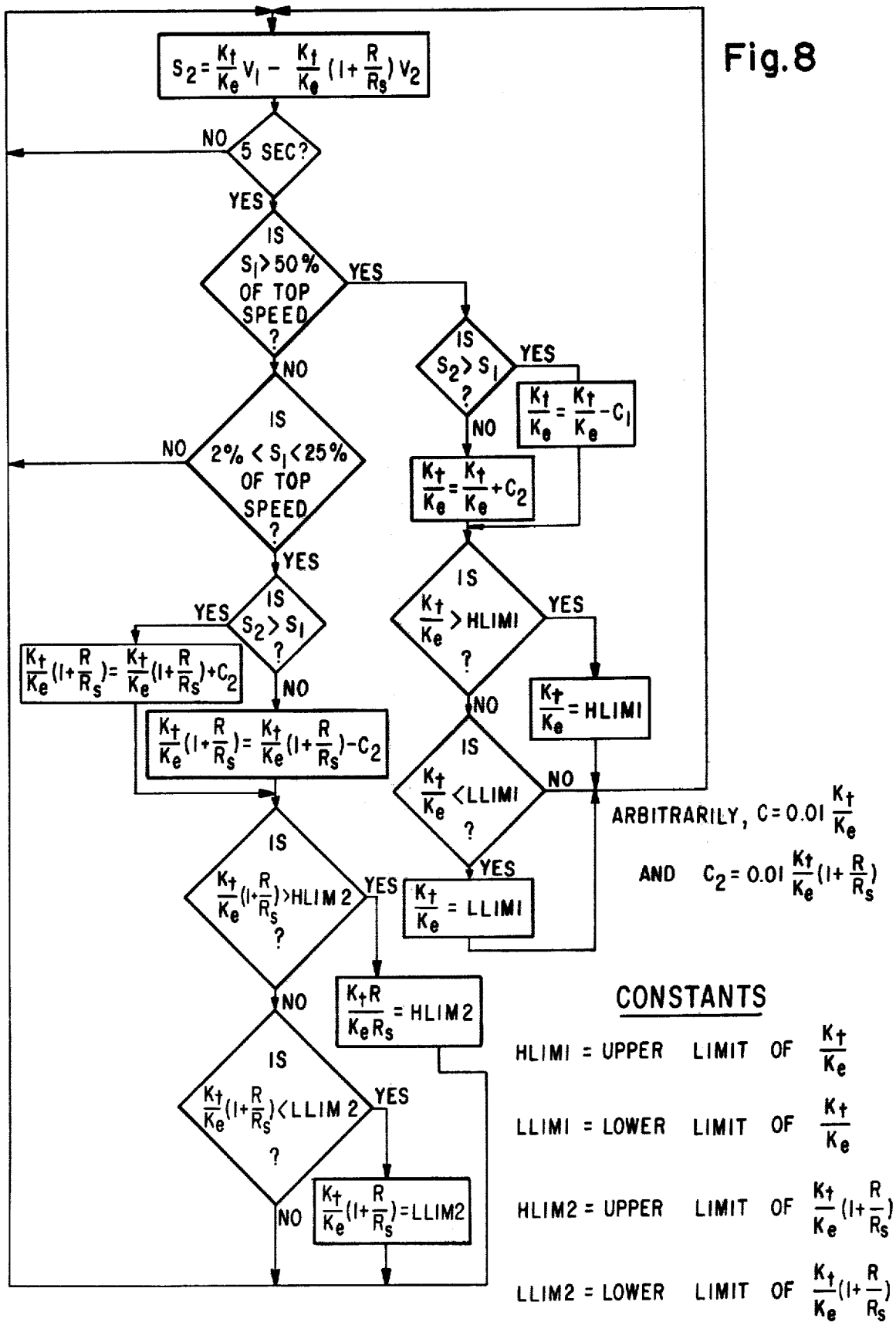
FIG. 8 is a flow diagram of a program for a computer or microprocessor implementation for the adaptive tachometer calculation circuit.

As an alternative to the circuit implementation described above, a computer or microprocessor implementation for the tachometer calculation circuit 30 may be programmed to operate in accordance with equation (6). FIG. 8 illustrates a flow diagram of the adaptive action of such implementation for changing the values of the constants, this adaptive action being repeated at a regular interval, illustratively every 5 seconds. As shown in FIG. 8, the constants $$\frac{K_t}{K_e} \text{ and } \frac{K_t R}{K_e R_s}$$

are only changed within predetermined fixed limits.

It is noted that the adaptive action is only operative in a low speed range for the motor and in a high speed range for the motor but not in an intermediate speed range. In order to achieve simplicity of operation, the foregoing description has assumed that one parameter is dominant at low speed and the other parameter is dominant at high speed so that only a single equation has to be solved for a single unknown. At intermediate speeds, one would have to solve two equations for two unknowns and for the particular application for which the present invention was designed, speed control of a sewing machine motor, such control mainly takes place either in the low speed range or the high speed range. However, it is contemplated that the basic principles of this invention may also be applied to other speed ranges by modifying the described algorithm.

Accordingly, there has been disclosed a motor speed control system utilizing tachometric feedback wherein an inexpensive speed sensor may be utilized without sacrificing accuracy. It is understood that the above-described embodiments are merely illustrative of the application of the principles of this invention. Numerous other embodiments may be devised by those skilled in the art without departing from the spirit and scope of this invention, as defined by the appended claims.

I claim:

1. In a motor speed control system for controlling a motor of the permanent magnet type, wherein a speed reference signal and a motor speed signal are compared to generate an error signal utilized to drive the motor, an arrangement for generating said motor speed signal comprising:
   first means for providing a first signal indicative of the instantaneous voltage across the motor;
   second means for providing a second signal indicative of the instantaneous current through the motor;
   third means utilizing said first and said second signals in accordance with a predetermined relationship for generating said motor speed signal, said predetermined relationship being a function of the motor resistance constant and the motor back EMF constant, said third means being substantially instantaneously responsive to changes in said first and second signals;
   tachometer means for monitoring the speed of the motor over a range of speeds and providing a speed calibration signal indicative of the speed of the motor, said tachometer means having a response characteristic substantially slower than said third means; and
   adaptive means utilizing said motor speed signal and said speed calibration signal for controlling said third means to correct for differences between said motor speed signal and said speed calibration signal, said adaptive means selectively varying the motor resistance constant when the motor speed is within a low range and selectively varying the motor back EMF constant when the motor speed is within a high range in accordance with said differences between said motor speed signal and said speed calibration signal.

2. The arrangement according to claim 1 wherein said third means includes a circuit component selected in accordance with parameters of said motor and said adaptive means includes means for electrically altering the value of said circuit component.

3. The arrangement according to claim 2 wherein said circuit component is a photoresistor and said adaptive means includes a light emitting element optically coupled to said photoresistor and means for controlling the amount of light emitted by said light emitting element.

4. The arrangement according to claim 1 wherein said third means includes a stored program computer utilizing a stored constant value for the generation of said motor speed signal and said adaptive means includes means for selectively altering said stored constant value.

* * * * *